United States Patent [19]

Yoshida et al.

[11] Patent Number: 4,648,687

[45] Date of Patent: Mar. 10, 1987

[54] OPTICAL SWITCHING DEVICE

[75] Inventors: Taizo Yoshida, Ikeda; Masaaki Mori, Kawasaki; Jiro Koyama, Suita; Masamitsu Haruna, Toyonaka, all of Japan

[73] Assignee: Ricoh Company, Ltd., Japan

[21] Appl. No.: 431,020

[22] Filed: Sep. 30, 1982

[30] Foreign Application Priority Data

Oct. 2, 1981 [JP] Japan ................................. 56-156116
Oct. 2, 1981 [JP] Japan ................................. 56-156117

[51] Int. Cl.$^4$ ................................................ G02B 6/10
[52] U.S. Cl. ................................. 350/96.13; 350/96.14
[58] Field of Search ............... 350/96.11, 96.12, 96.13, 350/96.14, 96.15

[56] References Cited

U.S. PATENT DOCUMENTS

| | | | |
|---|---|---|---|
| 3,819,250 | 6/1974 | Kibler | 350/96.29 |
| 3,883,220 | 5/1975 | Taylor | 350/96.14 |
| 4,127,320 | 11/1978 | Li | 350/96.13 |
| 4,236,156 | 11/1980 | Eden | 350/353 X |

FOREIGN PATENT DOCUMENTS 0088739  8/1978  Japan .......................... 350/96.13

OTHER PUBLICATIONS

"Temperature Dependence of the Optical Properties of Feroelectric LiNbo$_3$ and LiTao$_3$", By Miller et al., Applied Physics Letters, vol. 9, #4, Aug. 15, 1966.

"High-Speed Cutoff Modulator Using a Ti-diffused LiNbo$_3$ Channel Waveguide" by Neyer et al., Appl. Phys. Lett. 35(3) Aug. 1, 1979.

"Optical Bistability in LiNbo$_3$ Using a Monolithically Integrated Directional Coupler and Detector" by Gaglielmi, Integrated Optics, London, pp. 61-62, Sep. 1981.

*Primary Examiner*—William L. Sikes
*Assistant Examiner*—Akm E. Ullah
*Attorney, Agent, or Firm*—Guy W. Shoup

[57] ABSTRACT

An optical switching device for switching the transmission of light waves is provided. The main feature of the present invention is the usage of a light-transmitting, crystalline material having a temperature dependent index of refraction. That is, the light transmission condition is altered by controlling the temperature of such a material. In one form of the present invention, a main waveguide and a branched waveguide are provided and light waves are switched between the main and branched waveguides by controlling the temperature of a particlar portion of the intersection region. In another form of the present invention, a pair of waveguides is oppositely arranged in an end-to-end relation with a gap therebetween, and a switching region is defined in the gap. When the switching region is heated, the waveguides are optically connected; whereas, they are optically disconnected at normal temperature condition.

22 Claims, 13 Drawing Figures

OPTICAL SWITCHING DEVICE

BACKGROUND OF THE INVENTION

1. Field of the Invention

This invention generally relates to the light wave controlling technology and in particular to an optical switching device. More specifically, this invention relates to optical switching devices which carry out switching operation utilizing the temperature dependent characteristic of the index of refraction of crystalline materials.

2. Description of the Prior Art

In the field of optical information processing such as an optical communication system including optical memory devices and optical printers, devices for switching the transmission of light on and off are required. Such optical switching devices are desired to have minimum cross-talks, switching capability at lower power, high speed switching performance, low manufacturing cost, etc. Some of the prior art optical switching devices have been produced by utilizing the acoustooptic effect and others have been produced by utilizing the electrooptic effect.

FIG. 1 illustrates a prior art optical switching device 1 utilizing the electrooptic effect. FIG. 2 is a cross-sectional view of the optical switching device taken along I—I line in FIG. 1. As shown, the device 1 includes a substrate 6 made of a dielectric crystalline material such as LiNbO$_3$ and a planar waveguide 7 in the shape of "Y" having a higher index of refraction than that of the substrate 6 and formed in the surface of the substrate, for example, by Ti diffusion. The waveguide 7 includes an inlet waveguide section 7a and a pair of outlet waveguide sections 7b and 7c which branch out from the inlet section 7a. Also provided is an insulating layer 9 of SiO$_2$ or the like formed on the surface of the substrate covering the branching out section of the waveguide 7. On the insulating layer 9 are formed control electrodes 8a, 8b, 8c and 8d.

The control electrode 8b is located immediately above and in commensurate in shape with the waveguide sections 7a and 7b; while, the control electrode 8c is located immediately above and in commensurate in shape with the waveguide sections 7a and 7c. On the other hand, the control electrode 8a is formed similar in shape to and located in side-by-side relation with the electrode 8b, and its location is not immediately above the waveguide 7. The control electrode 8d is similarly arranged.

Under the condition, if a d.c. voltage is applied between the electrodes 8b, 8d and the electrodes 8a, 8c, an electric field directed in the direction of C axis of the dielectric crystal 6 is formed in the waveguide sections 7a, 7b and 7c, as best shown in FIG. 2. As a result, a difference in the indexes of refraction is produced between the waveguide sections 7b and 7c so that the light waves introduced into the waveguide section 7a come to propagate mostly into either one of the branching out sections 7b and 7c. That is, the light waves will propagate into the outlet waveguide section having a higher index of refraction. Thus the direction of propagation of light waves may be controlled by controlling the direction of voltage to be applied to the electrodes.

However, in the above-described optical switching device, sophisticated techniques are required for fabrication of the control electrodes since they must conform in shape to the waveguide. Furthermore, if the waveguide is to be structured for the single mode application, it is necessary to form a waveguide having a width in the order of 5 microns and thus difficulty will be encountered in the formation of control electrodes. Moreover, since the spacing between the adjacent electrodes will be extremely small in such application in which a d.c. voltage of some 10 volts will be applied to the control electrodes, a problem in voltage resistant characteristics will loom. It is also to be noted that a device design is rather limited because a d.c. voltage source is required as a source for driving the device.

Another prior art optical switching device 2 is illustrated in FIG. 3. This device includes a substrate 6 of a crystalline material such as LiNbO$_3$ and a slab 7 of Ti-diffused layer formed at the surface of the substrate 6 as a waveguide. A prism 10 of TiO$_2$ is mounted at one end of the slab waveguide 7, at the other end of which is provided an insulating layer 9 comprised of a material such as SiO$_2$, Al$_2$O$_3$, etc. On the insulating layer 9 are provided three parallel planar electrodes 8e-8g with their longitudinal directions in parallel with the longitudinal direction of the substrate 6. These electrodes 8e-8g are electrically connected to terminals 11a-11c, respectively, and these terminals are connected such that an appropriate d.c. voltage may be applied between the terminal 11b and the commonly connected terminals 11a and 11c.

With such a structure, when light waves are introduced into the slab waveguide 7 through the prism 10, they propagate toward the position where the electrodes 8e-8g are formed. Then, upon formation of an electric field to increase the index of refraction of that portion of the slab 7 immediately below the central electrode 8f by applying an appropriate voltage between the central electrode 8f and the side electrodes 8e and 8g, the light waves introduced are collected at and emitted from the location immediately below the central electrode 8f. On the contrary, if the voltage applied between the central electrode 8f and the commonly connected side electrodes 8e and 8g is reversed in polarity, the incident light waves will be distributed across the slab waveguide 7 and thus the intensity of the light emission from that portion of the waveguide in the vicinity of the central electrode 8f is significantly decreased. In this manner, depending upon the polarity and magnitude of a voltage applied between the central electrode 8f and the side electrodes 8e and 8g, the intensity of light emission from a particular location of the waveguide 7 varies. Accordingly, the device 2 of FIG. 3 can carry out optical switching.

However, in the above-described prior art device of FIG. 3, since the waveguide 7 is in the form of a slab, the direction of propagation varies depending upon the incident position and direction of incident light waves to the waveguide 7 so that switching characteristics are rather unstable and difficulty exists in fabricating an optical switching device of excellent quality. Moreover, provision of the insulating layer 9 is called for to limit the propagation loss of the light wave against the electrodes 8e-8g. Besides, the wide width of the slab waveguide 7 precludes the possibility of application to the single mode operation. In addition, narrow spacing between the adjacent electrodes makes it difficult to manufacture, and the required use of a d.c. voltage as a source also presents some disadvantages as discussed before.

As mentioned previously, it has also been proposed to provide an optical switching device with the utilization of acoustooptic effect. However, such a device is disadvantageous in that it tends to be expensive because it requires a crystalline material such as $PbMoO_4$ and $TeO_2$ and a transducer for converting an electrical signal into a ultrasonic signal. This prior art device is also disadvantaged in that it requires a significantly large driving power at high frequencies. Thus it is economically disadvantageous as well as limited in usage.

SUMMARY OF THE INVENTION

The disadvantages of the prior art are overcome with the present invention and a novel optical switching device is hereby provided.

Departing from the prior art concept for utilizing the electrooptic or acoustooptic effect of a crystalline material in producing an optical switch, the present invention has been made based on an entirely different idea, which, in essence, utilizes the temperature dependent characteristic of the index of refraction of crystalline materials. In an optical switching device of the present invention, the plane of polarization of incident light waves does not need to be oriented to a particular direction as different from the prior art device utilizing the electrooptic effect, and therefore the present device is operable even with white light.

One aspect of the present invention is to provide an optical switching device which is characterized by comprising a main waveguide and a branched-out waveguide branching out from the main waveguide, which are formed by a light transmitting medium having a temperature dependent index of refraction, and a heater element located at the intersection between the main and branched-out waveguides for heating the required sections of the waveguides for guiding the propagating light wave toward the branched-out waveguide when desired. By providing an insulating layer such as $SiO_2$ and $Al_2O_3$ on the surface of the substrate in which the main and branched-out waveguides are formed and then the heater element on the insulating layer, loss of the light wave travelling in the waveguide due to absorption by a metal which forms the heater element may be remarkably reduced.

Crystalline materials such as $LiNbO_3$, $LiTaO_3$, $TeO_2$ and quartz have temperature dependent indexes of refraction which increase in value as temperature increases. On the other hand, when light passes through the boundary between the two mediums having different indexes of refraction, it changes its direction of propagation such that the angle of refraction in the medium having a larger index of refraction is smaller. Accordingly, in the event that an inlet waveguide is divided into a multiple outlet waveguides in the direction of propagation and one of the outlet waveguides is heated to possess a higher index of refraction, light waves will be guided to propagate from the inlet waveguide to the heated outlet waveguide.

One aspect of the present invention has been made on the basis of the above considerations. That is, there is provided a main waveguide and at least one auxiliary waveguide branching out from the main waveguide, which are formed by a material having a temperature dependent index of refraction. Also provided is a heater element, comprised of an electrically resistive material which produces heat when an electric current is passed therethrough, at the location of intersection between the main and auxiliary waveguides. Under normal condition in which no current is supplied to the heater element, the waveguides are all uniform in temperature and thus in index of refraction so that light waves will propagate mainly along the main waveguide. On the other hand, when a current signal is supplied to the heater to raise the temperature and thus the index of refraction of the selected auxiliary waveguide, the wave travelling in the main waveguide toward the intersection will be guided into the heated auxiliary waveguide. Consequently, the direction of propagation of light is switched depending on the on/off control of an electric current.

In accordance with another aspect of the present invention, there is provided an optical switching device which comprises a pair of waveguides formed in the surface of a substrate and arranged in an end to end relation spaced apart from each other, the waveguides having a higher index of refraction than the substrate, a switching region defined in the substrate at least between the opposed ends of the waveguides, the switching region being formed by a light transmitting medium having a temperature dependent index of refraction which has a lower index of refraction when not heated, and a heater element for heating the switching region to make its index of refraction comparable to that of the waveguides. Preferably, an insulating layer of $SiO_2$, $Al_2O_3$ or the like is formed on the surface of the substrate st least to cover the switching region, and the heater element is provided on the insulating layer. With such a preferred structure, absorption of light waves travelling in the waveguides by the heater element which is usually made of a metal is substantially decreased. However, since the spacing between the opposed ends of the waveguides may be set at an extremely small value, if desired, it may be that provision of such an insulating layer is not necessary. It should also be noted that the switching region may be just a part of the substrate which has an index of refraction smaller than that of the waveguides in unheated condition.

In this aspect of the present invention, there is formed a discontinuity in an optical waveguide and a light transmitting material having a temperature dependent index of refraction which is smaller than that of the waveguide in unheated condition is filled in the discontinuity. Under the circumstances, if the filling material is low in temperature and thus lower in index of refraction than the waveguide, the light wave travelling in the waveguide will be scattered in every possible directions when it hits the discontinuity. Thus the light wave cannot be taken out from the other end of the waveguide, indicating that no output signal is obtained. On the other hand, when the filling material is heated to establish the matching of indexes of refraction, the discontinuity is temporarily repaired and thus the incident light wave may propagate along the waveguide without scatter. Accordingly the light wave travelling in the waveguide may be taken from the exit, indicating that an output signal is obtained. In this manner, optical switching operation can be carried out by making the waveguide optically continuous or discontinuous by heating or cooling the switching region defined between the opposed waveguides with a material having a temperature dependent index of refraction.

Accordingly, it is an object of the present invention to provide an optical switching device of excellent quality.

Another object of the present invention is to provide an optical switching device which requires a minimal driving power.

A further object of the present invention is to provide an optical switching device which may use any type of driving source.

A still further object of the present invention is to provide an optical switching device which is simple in structure and thus easy to manufacture.

A still further object of the present invention is to provide an optical switching device which is easily adaptable to single mode application.

A still further object of the present invention is to provide an optical switching device excellent in switching performance.

Other objects, advantages and novel features of the present invention will become apparent from the following detailed description of the invention when considered in conjunction with the accompanying drawings.

DESCRIPTION OF THE PREFERRED EMBODIMENTS

Figure 1:
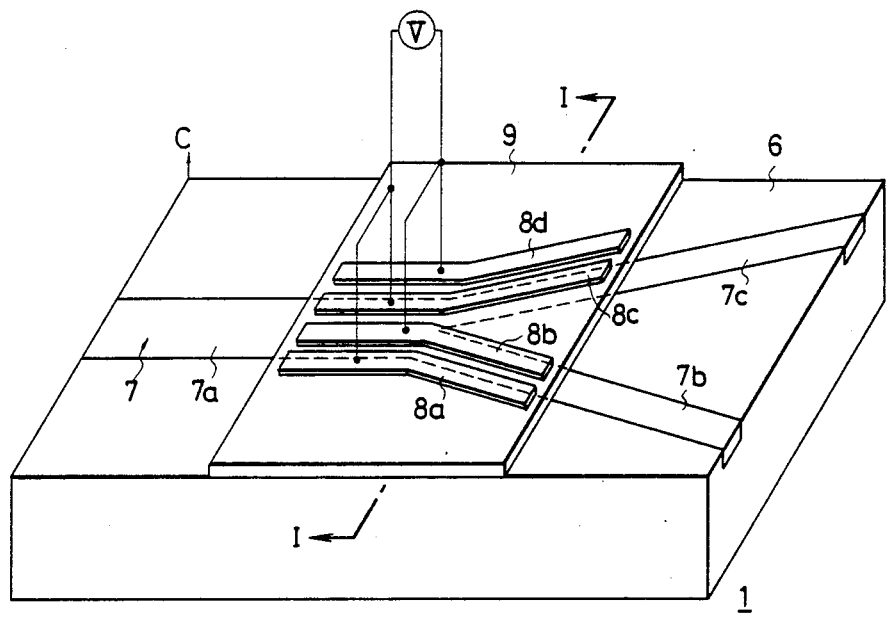
FIG. 1 is a perspective view schematically showing a prior art optical switching device utilizing the electrooptic effect.
Figure 2:
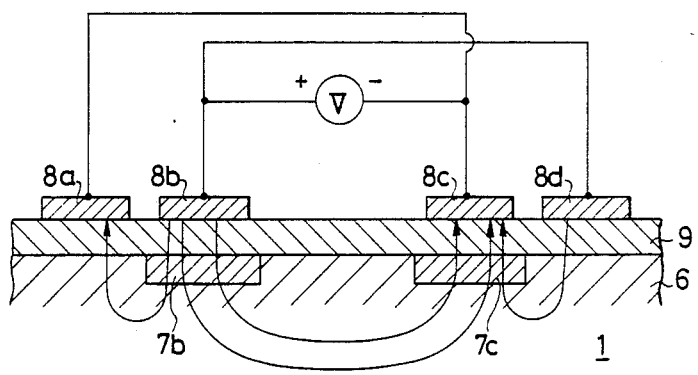
FIG. 2 is a cross-sectional view taken along I—I line in FIG. 1.
Figure 3:
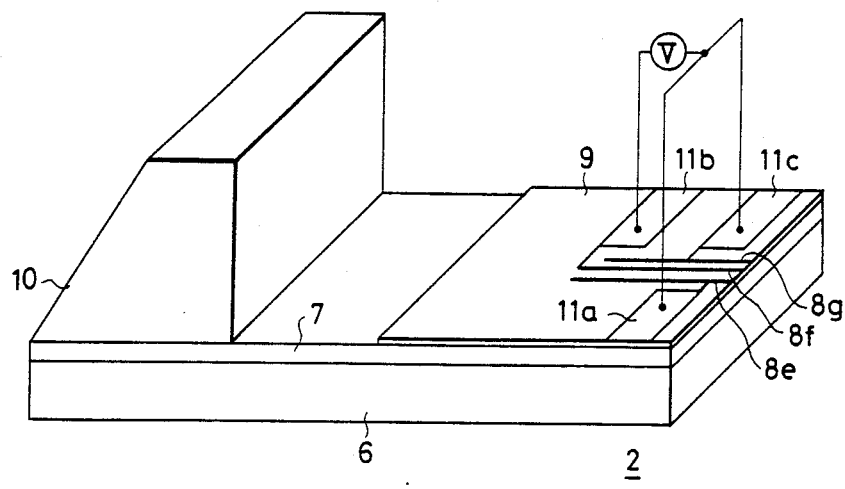
FIG. 3 is a perspective view schematically showing another prior art optical switching device utilizing the electrooptic effect.
Figure 4:
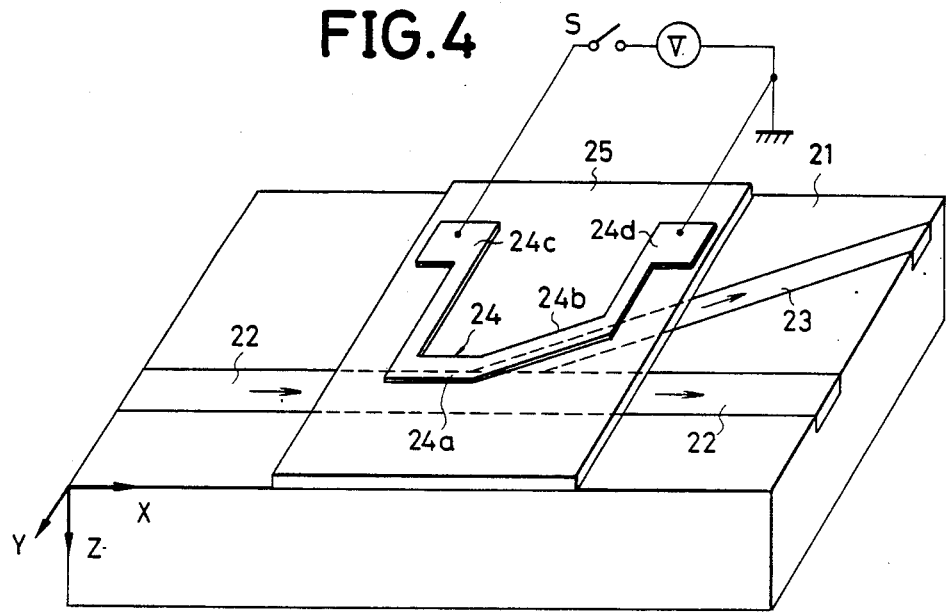
FIG. 4 is a perspective view schematically showing an optical switching device including main and branched-out waveguides in accordance with the present invention.

Referring now to FIG. 4, there is shown an optical switching device embodying the present invention which comprises a substrate 21 formed by cutting a crystal of $LiNbO_3$ with its Z axis directed perpendicular to the top and bottom surfaces. A main waveguide 22 and an auxiliary waveguide 23 branching out from the main waveguide 22 are formed in the top surface of the substrate 21 by selectively diffusing Ti. In this particular embodiment, the main waveguide 22 is provided to linearly extend from one end to the opposite end, and the auxiliary waveguide 23 is provided to branch out from the intersection located approximately in the middle of the main waveguide 22 and to extend straight to the exit end of the substrate. Accordingly, light waves entering into the main waveguide 22 will propagate along the main waveguide 22 to be emitted from its exit or they will be guided into the auxiliary waveguide 23 to be emitted from its exit which is spaced apart from the exit of the main waveguide 22.

As shown, the waveguides 22 and 23 formed in the substrate 21 are planar type optical waveguides which are rectangular in cross-sectional shape. The width W of the main waveguide 22 is preferably in the range between a few microns and several 10 microns. And the merging angle formed between the main and auxiliary waveguides 22 and 23 at their exit side should be appropriately determined depending upon the spacing between the exits and the length of the auxiliary waveguide 23, but it is preferable to be set in the order of a few degrees. The Ti-diffused waveguide portions 22 and 23 have an index of refraction larger than that of the substrate 21, and, in particular, the former has an index of refraction which is larger by the amount of about 0.015 for extraordinary light having its electric field directed in parallel with the Z axis.

It is to be noted that the waveguides 22 and 23 increase their value of index of refraction by 0.005–0.006 as temperature increases by 100° C. The depth of the waveguides determined by the diffusion process is approximately 2.4 microns, and it is sufficient to allow propagation of light waves in $TM_0$ and $TM_1$ modes. It should also be noted that the intended objectives of the present invention may be attained even if the waveguides 22 and 23 are so structured to permit propagation of light waves only in a single mode.

On the top surface of the substrate 21 is provided an insulating layer 25 of $SiO_2$ or the like, which is preferably 0.2 microns thick. As shown, the insulating layer 25 is provided to cover the intersection or branching out point between the main and auxiliary waveguides 22 and 23 as a buffer layer because a heater element 24 usually comprised of a metal will be provided thereon as will be described in detail hereinbelow. The heater element 24 is comprised of an electrically resistive material such as a Ni-Cr alloy which produces heat when an electric current is passed therethrough and it is formed in a particular shape to heat desired portions of the waveguides.

Figure 5:
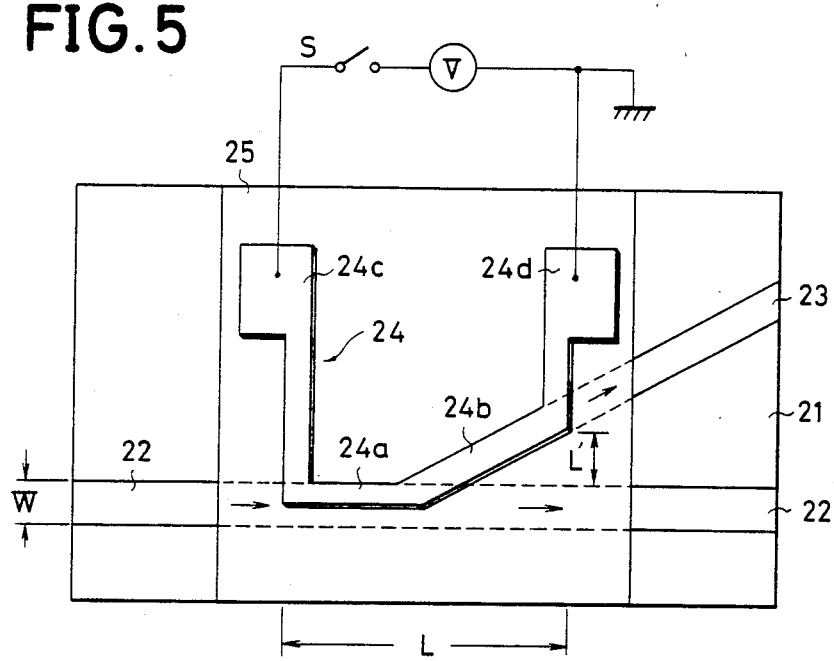
FIG. 5 is a plan view of the optical switching device shown in FIG. 4.

As best shown in FIG. 5, the heater element 24 includes a leading section 24a and a guiding section 24b. The leading section 24a is provided to extend from the branching out point between the main and auxiliary waveguides 22 and 23 over a predetermined length to the entrance of the main waveguide 22, and it is narrower in width as compared with the width W of the main waveguide 22. When the leading section 24a has such a narrower width, it should be located as shifted to the side where the auxiliary waveguide 23 is provided as will become clear later. It should however be noted that the leading section 24a may be made to have a width which is comparable to or larger than the width W, though it is preferable to structure the leading section 24a as shown in FIG. 5. On the other hand, the guiding section 24b is provided to extend from the intersection between the main and auxiliary waveguides 22 and 23 over a predetermined length toward the exit of the auxiliary waveguide 23, and it is formed to have a width which is substantially equal to the width of the channel 23. It is to be noted that the guiding section 24b may be made narrower or wider in width, if desired, The heater element 24 also comprises a bonding section 24c as connected to the front end of the leading section 24a and another bonding section 24d as connected to the trailing end of the guiding section 24b. It is to be noted that only the leading and guiding sections 24a and 24b are required to produce heat and the rest of the heater element 24 may be made by any appropriate material. Leads are connected to the bonding sections 24c and 24d such that a voltage V may be applied to pass a current through the heater element 24. Any appropriate voltage source may be used to apply the voltage V; for example, a commercial line a.c. voltage may be used as well as a d.c. voltage. The only requirement here is that an electric current is applied to the heater element 24 to heat the desired portions of the waveguides to carry out optical switching operation.

The length L of the heater element 24 may, for example, be set around 3 mm and the length of the guiding section 24b may be preferably set such that the distance L' is around 10 microns. However, the length of the guiding section 24b should be determined in each application in order to insure that the light waves guided into the auxiliary channel 23 may be appropriately emitted through its exit.

In the optical switching device as described above, when no current is applied to the heater element 24, light waves such as TM light waves introduced into the main channel 22 will propagate straight to its exit passing through the branching out point, and very little light waves will appear at the exit of the auxiliary channel 23. For example, the amount of light waves emitting from the exit of the channel 23 is below 1/10 of that emitting from the exit of the channel 22. On the other hand, when voltage V is applied to supply a current, the heater element 24 produces heat to heat mainly those portions of the waveguides 22 and 23 that are located immediately therebelow. As a result, the index of refraction increases at those heated portions of the waveguides which then causes the light waves approaching the branch-out point to deflect toward the auxiliary channel 23 so that the light waves are now mainly emitted from the exit of the channel 23. In other words, by supplying current to the heater element 24, the intensity of emitting light at the exit of the channel 23 is increased; whereas, the increased light intensity will shift to the exit of the channel 22 by discontinuing the supply of current to the heater element 24. In this manner, the direction of propagation of light waves may be changed by electrical on/off control of the heater element 24.

As is apparent from what has been described above, since the heater element 24 of the present invention is provided to heat desired portions of the waveguides 22 and 23 its size, particularly in width, is not so critical. Moreover, it is rather simple in shape and thus it is easy to manufacture. Besides, in accordance with the present invention, it is not necessary to provide a plurality of heater elements arranged side-by-side as in the prior art utilizing the electrooptic effect for carrying out optical switching operation, so that a problem of voltage resistant characteristic will not arise. This is particularly advantageous when the present optical switching device is to be structured for the application of transmitting single-moded light waves highly desirable for multiplex communication. That is, when a channel waveguide is to be structured for single mode application in its width as well as its depth, the width becomes 5 microns or less. However, since the heater element is rather simple in structure, it may be easily provided and no practical problem will be brought about. Further, the present invention only requires a source voltage to apply current to the heater element for producing heat so that any type of voltage source, whether a.c. or d.c., may be applied to the present invention.

It is to be noted that the substrate 21 may be made of a material other than $LiNbO_3$ For example, various dielectric crystalline materials which have temperature dependent indexes of refraction such as quartz may also be used. The waveguides 22 and 23 may be formed by diffusing a material other than Ti. The heater element 24, particularly its leading and guiding sections 24a and 24b may also be made by a material other than a Ni-Cr alloy; whereas, the other sections of the heater element 24 may be made by a material of good electrical conductivity such as Al and Au. Moreover, if the substrate 21 is made from a sliced crystal of $LiNbO_3$ with its Y axis directed perpendicular to the top and bottom surfaces of the substrate 21 and use is made of TE light waves, the heater element 24 may be directly formed on the top surface of the substrate 21 without the insulating layer 25 because propagation loss in such a structure will be negligible.

Figure 6:
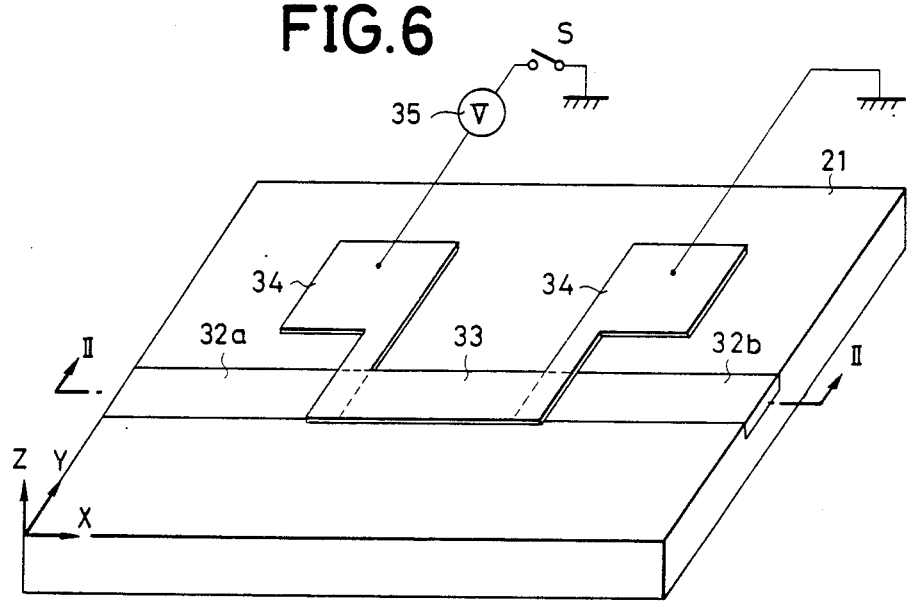
FIG. 6 is a perspective view schematically showing another optical switching device embodying the present invention in which a pair of waveguides is provided with end-to-end relation.
Figure 7:
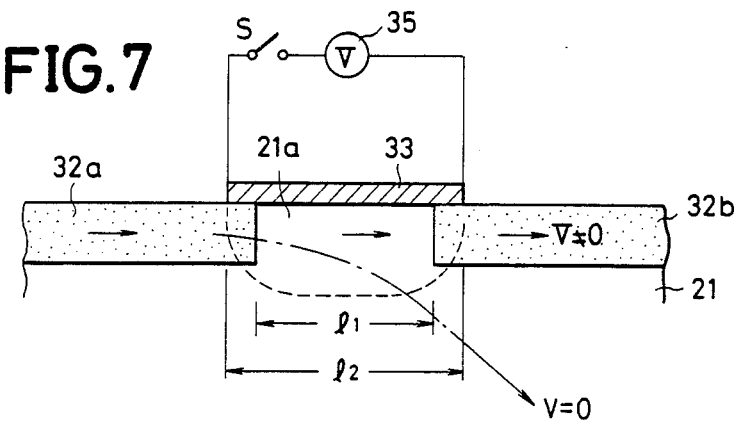
FIG. 7 is a fragmentary, cross-sectional view of the optical switching device taken along II—II line in FIG. 6.
Figure 8:
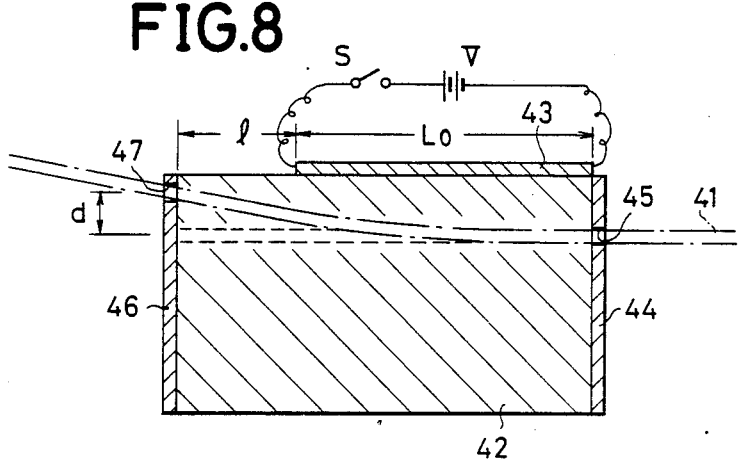
FIG. 8 is a schematic illustration showing another modification in accordance with the principle of the present invention.

FIG. 6 shows another embodiment of the present invention in which a pair of waveguides is oppositely arranged in end to end relation, and FIG. 7 shows the structure in cross-section taken along II—II line shown in FIG. 6. Incidentally, it is to be noted that as practiced throughout the present specification like reference numerals indicate like elements. In the optical switching device shown in FIGS. 6 and 7, a pair of channel type waveguides 32a and 32b are formed by Ti diffusion in the surface of the $LiNbO_3$ substrate 21 having Z axis directed perpendicular to the top and bottom surfaces. The inlet waveguide 32a and the outlet waveguide 32b are arranged in a line with a gap therebetween. That is, the exit end of the inlet waveguide 32a is opposed to the entrance end of the outlet waveguide 32b spaced apart over a distance $l_1$ and the gap is filled with the substrate material $LiNbO_3$.

The waveguides 32a and 32b have a larger index of refraction than the substrate 21, and, in particular, it is larger by the amount of approximately 0.015 for extraordinary light having the direction of electric field in parallel with the Z axis. The Ti-diffused waveguides 32a and 32b are a few microns deep, e.g., 2.4 microns, and it is deep enough to allow propagation of light waves in $TM_0$ and $TM_1$ modes. It should however be noted that the channels 32a and 32b may be so structured to allow propagation of single-moded light waves only.

On the surface of the substrate 21 is formed a heater element 33 having a length $l_2$ and extending over the gap between the waveguides 32a and 32b partially overlapping the end portions thereof. The heater element 33 is preferably made of a Ni-Cr alloy by any conventional technique such as vapor deposition. The heater element 33 is connected from its both ends to a pair of terminal sections 34, 34 which may be made of a material different from the one used for the heater element 33. One of the terminal sections is connected to ground and the other terminal section is connected to ground via a voltage source 35 which may be a d.c. or a.c. voltage source. A commercial power line voltage may be used as long as the heater element 33 may be properly heated by receiving current therefrom.

When the heater element 33 is activated to produce heat, a switching region 21a defined at the gap portion as indicated by the dotted line in FIG. 7 is heated to increase its temperature and thus index of refraction until the index of refraction of the switching region 21a becomes comparable to that of the waveguides 32a and 32b. Under the condition, the physically separate waveguides 32a and 32b are optically connected to establish a continuous waveguide thereby allowing to transmit light waves from the inlet channel 32a to the outlet channel 32b. On the other hand, if no current is supplied and thus the switching region 21a is at low temperature, the region 21a has a smaller index of refraction than the waveguides 32a and 32b, so that the channels 32a and 32b are left disconnected and incident light waves will be scattered upon reaching the gap region. In this manner, the gap or discontinuous region 21a functions as a switching region depending on whether or not it is heated.

It is to be noted that the switching region 21a may be made just by a part of the substrate 21 or it may be formed by a separate material having a temperature dependent index of refraction which is lower in value than that of the waveguides 32a and 32b at lower temperature but comparable at elevated temperature. When the switching region 21a is made simply by a part of the substrate 21, its size is determined by the gap length $l_1$ and the heater length $l_2$. The size of the switching region 21a must be appropriately determined because it affects the SN ratio in optical switching. When the heater element 33 is not activated, incident light waves will be scattered at the gap and very little light will be transmitted to the outlet channel 32b. However, the amount of the light waves transmitted to the outlet channel 32b under the circumstances depends upon the length of the switching region 21a, i.e., the longer the switching region 21a, the smaller the level of noise at the outlet channel 32b. From a practical viewpoint, the SN ratio should be set at least in the range between 10 dB and 20 dB, preferably at 20 dB or more. In this connection, the length $l_1$ or $l_2$ must be set in the order of several hundred microns, e.g., 400 microns.

In order to prevent the light waves travelling in the gap region 21a from being absorbed by contact with the heater element 33 thereby eliminating production of loss in the output light amount, a buffer layer of $SiO_2$, $Al_2O_3$ or the like may be formed on the top surface of the substrate at least where the heater element 33 is to be formed. With such a structure, direct contact between the light waves travelling in the switching region 21a and the heater element 33 may be advantageously avoided. However, in the case where the gap distance is rather short and in the order of several hundred microns, propagation loss of light waves due to direct contact with the metal heater element 33 is extremely small and thus provision of such a buffer layer may not be necessary in consideration of other factors.

It is preferable to use a Ni-Cr alloy in forming the heater element 33 because of its small heat capacity and high heating efficiency so that a high switching speed may be obtained. The terminal sections 34, 34 on the other hand are preferably made of a good electrical conductive material such as Al and Au which does not produce a significant amount of heat because with such a structure the substrate 21 is prevented from being heated undesirably thereby contributing to keep light waves confined in the waveguides and the switching region.

In an optical switching device having the above-described structure, if current is not supplied to the heater element 33, light waves such as TM light waves travelling along the inlet channel 32a in the X direction will be scattered as indicated by the one-dotted line when the waves hit the boundary between the end of the channel 32a and the switching region 21a, the index of refraction of which is smaller. For this reason, the amount of light waves transmitted to the opposing channel 32b is very small and thus the intensity of the light emitting from the outlet channel 32b is very low. On the other hand, when current is passed through the heater element 33 to raise the temperature of the switching region 21a to the point where the index of refraction of the region 21a is comparable to that of the waveguides 32a and 32b, the switching region 21a is temporarily converted into a waveguide to optically connect the oppositely arranged waveguides 32a and 32b. Thus the light waves travelling along the waveguide 32a may be transmitted to the outlet waveguide 32b via the switching region 21a now functioning as a temporary waveguide as indicated by the solid line arrows shown in FIG. 7. As a result, high light intensity is obtained at the exit of the outlet waveguide 32b.

As described in detail above, the intensity of the light emitting from the outlet channel 32b may be changed with a high SN ratio by controlling the supply of current to the heater element. It is also to be noted that the heater element 33 and the switching region 21a are rather small in heat capacity, the switching speed is quite high, e.g., below 1 msec. Moreover, the voltage source 35 is only required to heat the heater element 33 by supplying current therethrough, it may be an a.c. voltage source as well as a d.c. voltage source; in addition, the level of the voltage to be applied to the heater element 33 may be smaller than 20 V, which, of course, also depends on the shape and material of the heater element 33. As an interesting comparison, if an attempt is to be made to fabricate an optical switching device utilizing the electrooptic effect of $LiNbO_3$ which is comparable in performance with the present invention, an extremely high electric field of $10^5$ V/cm or more will be required. It is practically impossible to fabricate such a device, however.

As may have been already noticed, the shape of the heater element 33 is quite simple, namely a simple straight strip, so that it may be formed with ease. This is an important advantage over the prior art utilizing the electrooptic effect in which case provision of a plurality of parallely and closely arranged electrodes is required. Such an advantage will be even more appreciated when an optical switching device is to be designed for the transmission of single moded light waves as discussed before. Another immediate advantage arising from the structure of this embodiment is the easiness in forming an array of light switches. It is to be noted that this second embodiment also possesses various other advantages as discussed in connection with the first embodiment.

Now, other embodiments of the present invention will be described with reference to FIGS. 8 through 13. The optical switching device shown in FIG. 8 comprises a substrate 42 of a light emitting, crystalline material such as $LiNbO_3$, $LiTaO_3$, $TeO_2$ and quartz, which has a temperature dependent index of refraction, and the substrate 42 is generally in the shape of a rectangular body having a width $L_o+1$. On the top surface of the substrate 42 is formed a strip of heater element 43 having the length $L_o$ and extending along the width of the substrate 42 from the right end thereof. As described previously, the heater element 43 may be made from an electric current-induced-heat-producing material such as Ni-Cr alloy, and it may be formed, for example, by evaporation.

On the right-hand side surface of the substrate 42 is provided an inlet mask 44 which is provided with an inlet opening 45 to allow a light beam to advance into the substrate 42 in the direction in parallel with the lengthwise direction of the heater strip 43. Thus the opening 45 is usually located immediately below the front end of the heater strip 43. It is preferable that the incident light beam 41 be as small as possible so as to reduce the effect of cross-talk. On the other hand, an outlet mask 46 having an outlet opening 47 is provided on the opposite side of the substrate 42. It is to be noted that the outlet opening 47 is located above the horizontal line extending from the inlet opening 45 over a distance d. An appropriate current may be applied across the heater strip 43 from a voltage source V when a switch S is closed.

Figure 9:
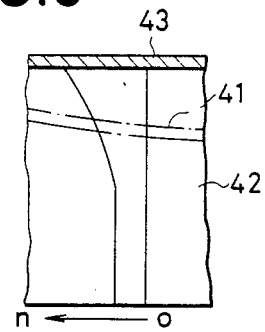
FIG. 9 is a schematic illustration useful for understanding the operation of the device shown in FIG. 8.

When current is passed through the heater strip 43, the substrate 42 is heated from the contact surface with the heater strip 43 and there is formed a temperature distribution inside the substrate 42 with the temperature decreasing as separated further away from the contact surface with the heater strip 43. As a result, there is formed a distribution of index of refraction in the substrate as shown in FIG. 9. The temperature is higher toward the heater strip 43, so is the index of refraction. Under the circumstances, when the light beam 41 advances into the substrate 42 through the inlet opening 45, it is deflected upward according to the distribution of index of refraction while it travels below the heater strip. When the light beam reaches the end of the heater strip 43, i.e, at distance $L_o$ from the opening 45, it now advances generally along a straight path because variations in index of refraction are smaller in the region over distance 1. Then the beam finally reaches the outlet opening 47 to be emitted therethrough. In this fashion, when current is supplied to the heater strip 43, the light beam 41 is emitted through the opening 47; whereas, if no current is supplied, the light beam 41 impinges upon the mask 46 and thus the beam is not emitted.

It may be easily shown that the following relation exists among deflection distance d, heater strip length $L_o$ and the length 1 of the non-heating section.

$$d = l \cdot L \cdot \Delta n / D$$

where,
$\Delta n$: change in index of refraction of the crystalline material due to temperature,
D: depth of change in index of refraction due to heating( typically 0.5–1.0 mm ).

In the case where the crystalline material forming the substrate 42 is quartz, the ratio of a change in index of refraction $\Delta n$ to a temperature change $\Delta T$, i.e., $\Delta n/\Delta T$, is approximately equal to $10^{-5}$. Thus, supposing that the temperature increment $\Delta T$ is 100 °C. and the depth D is 0.5 mm, the deflection distance d may be calculated from the above equation to be $d = 2 \times 10^{-3}$ 1L. Then, if L=10 mm and l=5 mm, d=0.1 mm is obtained. As a result, if the heater strip 43 is made 10 mm long and the non-heated section is 5 mm long, then the outlet opening 47 should be positioned 0.1 mm above the horizontal line extended from the inlet opening 45. That is, in an optical switch which is dimensioned as above, current must be supplied to the heater strip 43 such that a temperature increment of approximately 100 °C. is attained.

Figure 10:
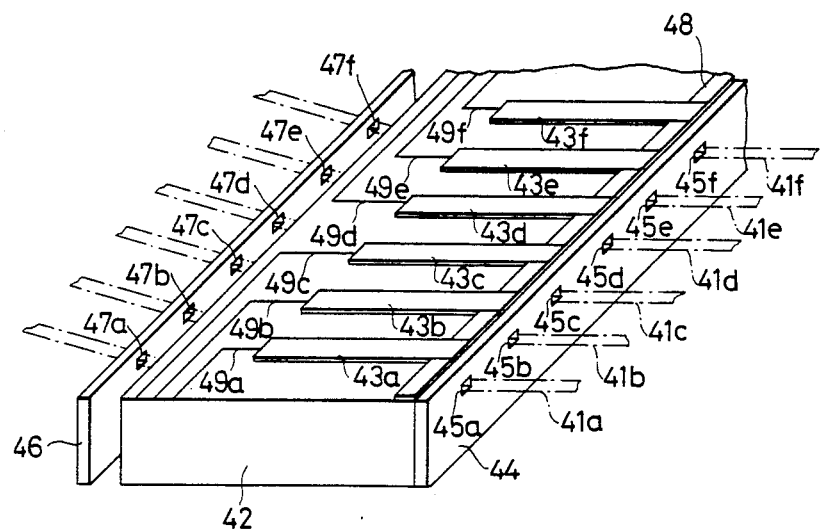
FIG. 10 is a perspective view schematically illustrating a further optical switching device manufactured in accordance with the present invention.

As may be readily understood, an array of optical switches can be constructed by arranging a plurality of heater strips 43 together with inlet and outlet openings 45 and 47 side-by-side, and such an optical switch array may be applied to a display device, printer and the like. FIG. 10 illustrates one example of such application. As shown, a plurality of heater strips 43a–43f are arranged side-by-side on the top surface of a substrate 42. A common electrode 48 is also provided on the top surface of and along the front side of the substrate 42 as connected to one end of each of the heater strips 43a–43f. Leads 49a–49f are connected to the opposite ends of the respective heater strips 43a–43f so that current may be supplied to the heater strips 43a–43f individually.

On the front surface of the substrate 42 is provided an inlet mask 44 which is provided with a plurality of inlet openings 45a–45f corresponding in position to the associated heater strips 43a–43f. Thus, light beams 41a–41f may be introduced into the substrate 42 through the respective openings 45a–45f, and the beams will advance in parallel with the associated heater strips if they are not activated. An outlet mask 46 is attached to the back side of the substrate ( In FIG. 10, the mask 46 is shown to be separated away from the substrate 42. ) 42, and it is provided with a plurality of outlet openings 47a–47f. These outlet openings are positioned above the horizontal lines extended from the respective inlet openings as explained before.

With the above-described structure, by controlling the supply of current to each of the heater strips 43a–43f, a plurality of optical switches may be controlled on and off individually. Thus such a structure may be applied to a display device, printer and the like with ease.

Figure 11:
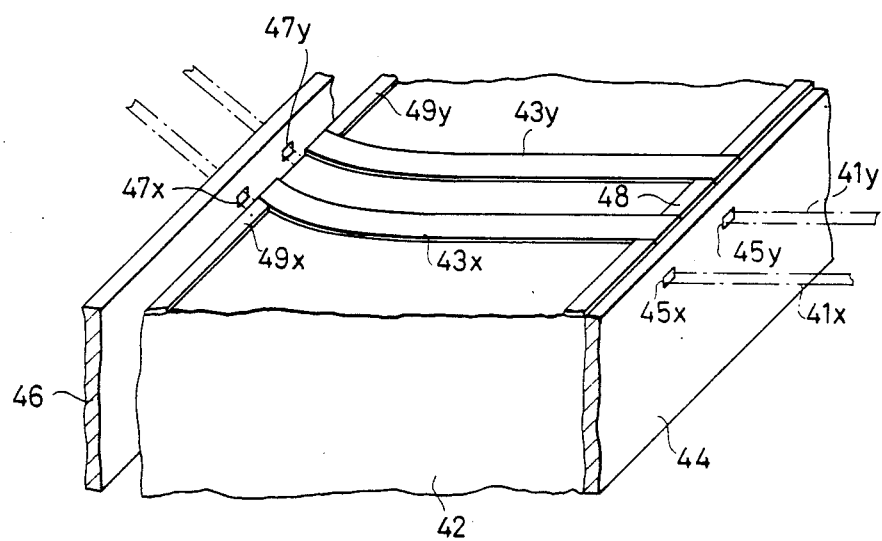
FIG. 11 is a perspective view schematically illustrating a still further optical switching device fabricated in accordance with the present invention.
Figure 12:
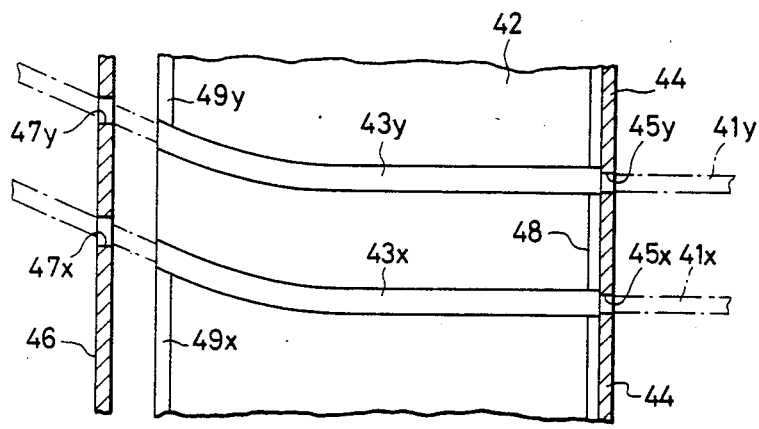
FIG. 12 is a plan view of the device shown in FIG. 11.

FIGS. 11 and 12 show a modification of the above embodiment shown in FIG. 10. In this modified example, the heater strips $43_x$ and $43_y$ are provided to extend from the front end to the back end, and they are comprised of two sections, i.e., a front half section which is straight and a back half section which is curved to the right as best shown in FIG. 12. The heater strips $43_x$ and $43_y$ are also connected to a voltage source via individual leads $49_x$ and $49_y$ such that they may be supplied with current individually. It is to be noted that the outlet openings $47_x$ and $47_y$ are positioned as shifted sideways corresponding to the curvature of the heater strips. Such a structure also provides an array of optical switches which has a variety of applications.

In the above-described embodiments of the present invention, there is very little cross-talk and the switching speed is extremely fast. For example, in the case where the substrate is made of quartz having the heat transfer coefficient of $6.75 \times 10^{-3}$ cm$^2$/sec, since the rate of temperature increase of the substrate is proportional to the product of the heat transfer coefficient and the width of the heater strip squared, the switching speed in the order of 1 msec may be easily obtained.

Figure 13:
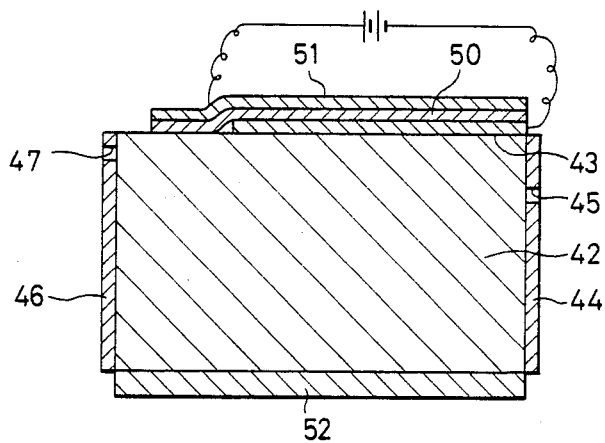
FIG. 13 is a schematic illustration showing a still further embodiment of the present invention in which a cooling means is provided to speed up the switching operation.

It is to be noted that the switching speed may be significantly improved by appropriately determining the size and shape of the heater strip and providing a heat sink. FIG. 13 shows one such example. As shown, the device includes the substrate 42, front and back masks 45 and 46 and heater strip 43 similarly with the above-described embodiments. However, in this example, there is also provided an insulating layer 50 of SiO$_2$ or the like overlying the heater strip 43, and furthermore a heat dissipating layer 51 comprised of a metal having a high heat releasing characteristic is formed on the insulating layer 50. In addition, a heat releasing plate 52, preferably comprised of a metal, ceramics, etc. having a high heat releasing characteristic, is attached to the bottom of the substrate 42. By providing the switching device with such a heat sink function, the heated portion of the substrate may return to the unheated condition more quickly thus allowing to improve the switching speed significantly.

While the above provides a full and complete disclosure of the preferred embodiments of the present invention, various modifications, alternate constructions and equivalents may be employed without departing from the true spirit and scope of the invention. Therefore, the above description and illustration should not be construed as limiting the scope of the invention, which is defined by the appended claims.

What is claimed is:

1. An optical switching device comprising:
  a substrate of a material having a temperature dependent index of refraction;
  a main waveguide formed in the surface of said substrate;
  an auxiliary waveguide formed in the surface of said substrate branching out from said main waveguide, said main and auxiliary waveguides being formed by selectively diffusing a selected material into the surface of said substrate so that said waveguides have an index of refraction different from said substrate; and
  heating means for selectively heating selected portions of said main and auxiliary waveguides at an intersection therebetween to thereby locally change the index of refractions of said selected portions such that said main and auxiliary waveguides are optically coupled so that light waves introduced into said main waveguide are substantially switched into said auxiliary waveguide when said heating means is activated; whereas, said main and auxiliary waveguides are optically decoupled so that light waves are not substantially switched into said auxiliary waveguide when said heating means is not activated.

2. The device of claim 1 further compromising a buffer layer formed on the surface of said subtrate and said heater means is provided on said buffer layer.

3. The device of claim 2 wherein said buffer layer is comprised of an insulating material such as SiO$_2$ and Al$_2$O$_3$.

4. The device of claim 1 wherein said substrate is comprised of a crystalline material selected from the group mainly consisting of LiNbO$_3$, LiTaO$_3$, TeO$_2$ and quartz.

5. The device of claim 1 wherein the Z axis of said substrate is oriented perpendicular to the surface where said waveguides are formed.

6. The device of claim 1 wherein said main and auxiliary waveguides are formed by Ti-diffusion.

7. The device of claim 1 wherein said main and auxiliary waveguides are rectangular in cross-sectional shape.

8. The device of claim 7 wherein said main waveguide extends straight from an inlet through which light waves are introduced into said main waveguide to a first outlet and said auxiliary waveguide extends straight from the branching out point to a second outlet, whereby said introduced light waves may be switchingly emitted from either of said first and second outlets.

9. The device of claim 8 wherein the angle formed between said main and auxiliary waveguides is in the order of 2-3 degrees.

10. The device of claim 8 wherein said heating means includes a leading section extending from the intersection between said main and auxiliary waveguides toward said entrance along said main waveguide over a predetermined distance and a guiding section extending from said intersection toward said second outlet along said auxiliary waveguide over a predetermined distance.

11. The device of claim 10 wherein said leading and guiding sections are comprised of an electrically resistive material which produces heat when an electric current is passed therethrough.

12. The device of claim 11 wherein said leading section is narrower in width than said main waveguide and its location is shifted to the side of said main waveguide where said auxiliary waveguide is provided.

13. An optional switching device comprising:
  a substrate having a main surface;
  a first waveguide formed in said main surface, said first waveguide having a first end surface;
  a second waveguide formed in said main surface, said second waveguide having a second end surface in opposed relation to and spaced apart from said first end surface;
  a switching region generally defined between said first and second end surfaces, said switching region being comprised of material having a temperature dependent index of refraction which is different from that of said waveguides at normal temperature condition and becomes comparable to that of said waveguides when heated; and
  (a) heating means for heating said switching region when activated thereby optically connecting said first and second waveguides to substantially transmit light waves from one of said waveguides to the other.

14. The device of claim 13 wherein said switching region is formed by a part of said substrate.

15. The device of claim 14 wherein said material having a temperature dependent index of refraction is a light-transmitting, crystalline material selected from the group mainly consisting of LiNbO$_3$, LiTaO$_3$, TeO$_2$ and quartz.

16. The device of claim 13 wherein said waveguides are formed by diffusing Ti into said substrate.

17. The device of claim 13 wherein said waveguides are rectangular in cross-section and arranged along a straight line.

18. The device of claim 17 wherein said heating means is a metal strip extending along said switching region between said first and second waveguides, said metal strip produces heat to raise the temperature of said switching region when current is passed therethrough.

19. The device of claim 17 wherein said metal strip has end portions overlapping the opposed end portions of said first and second waveguides.

20. The device of claim 18 or 19 further comprising a buffer layer formed at least partly on the main surface of said substrate and said metal strip is formed on said buffer layer.

21. The device of claim 20 wherein said buffer layer is comprised of an insulating material such as $SiO_2$ and $Al_2O_3$.

22. The device of claim 17 wherein said metal strip is comprised of a Ni-Cr alloy.

* * * * *